(No Model.)
C. C. SMITH.
ICE FREEZING MACHINE.
No. 450,199. Patented Apr. 14, 1891.
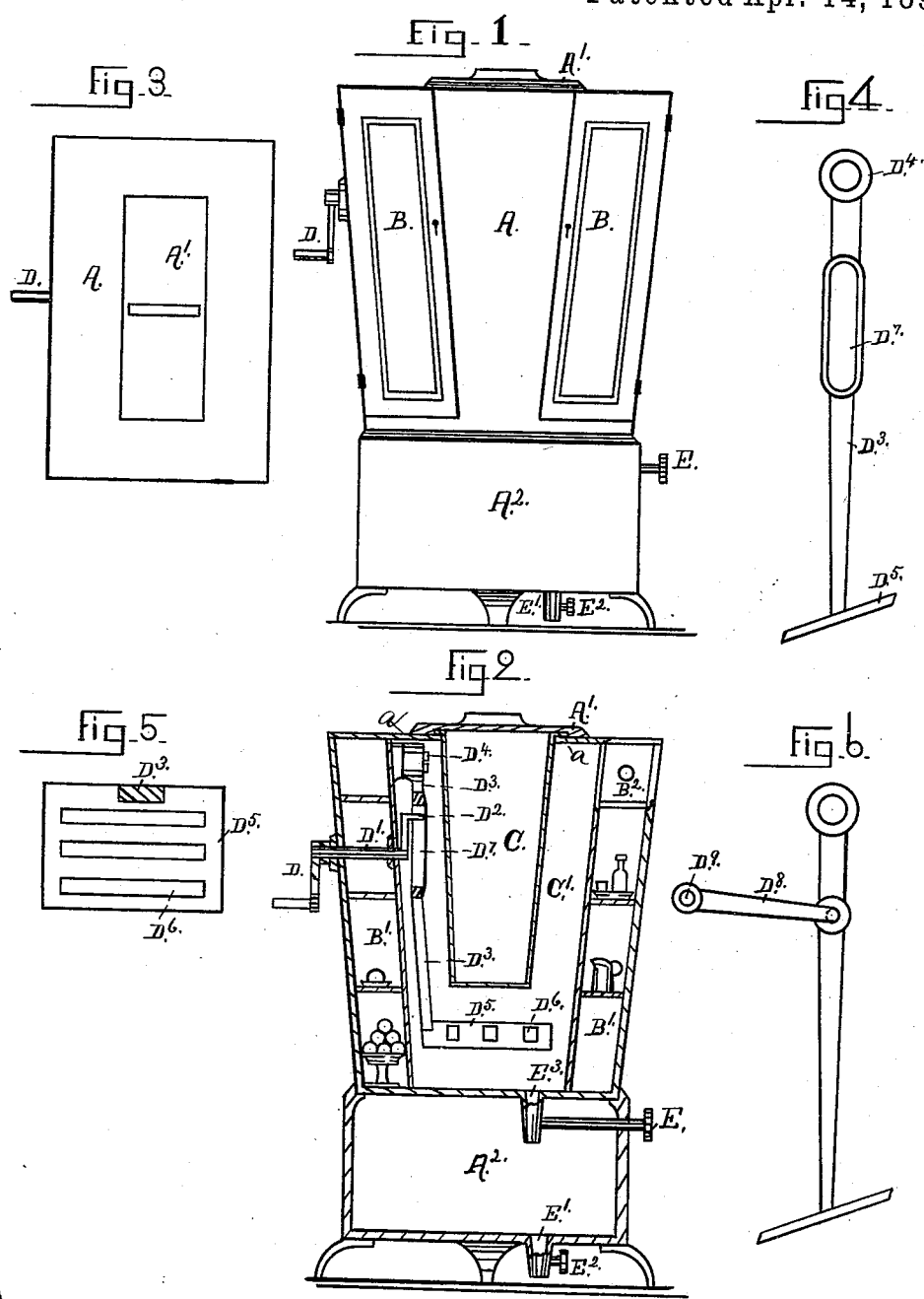

UNITED STATES PATENT OFFICE.

CHARLES C. SMITH, OF BROOKLYN, ASSIGNOR TO HARVEY M. LEWIS, OF NEW YORK, N. Y.

ICE-FREEZING MACHINE.

SPECIFICATION forming part of Letters Patent No. 450,199, dated April 14, 1891.

Application filed July 5, 1890. Serial No. 357,903. (No model.)

*To all whom it may concern:*

Be it known that I, CHARLES C. SMITH, a citizen of the United States, and a resident of the city of Brooklyn, in the county of Kings and State of New York, have invented a certain new and useful Improvement in Ice-Freezing Machines, of which the following is a specification.

The object of this invention is to freeze water and cool articles of food and drink.

The invention consists in the construction of the case for the liquids and of the agitator.

Figure 1 is a front view of the freezing-machine. Fig. 2 is a vertical sectional view of Fig. 1. Fig. 3 is a top view of Fig. 1. Fig. 4 is a side view of the agitator. Fig. 5 is a top view of the agitator-blade, and Fig. 6 is a modification of the agitator.

In machines for freezing ice by the use of a freezing compound or liquid one of the first requisites is to provide some means by which the liquid may be constantly agitated and caused to circulate rapidly, so that all of it may come in contact with the vessel containing the article to be frozen, in order that the heat of the article may be absorbed by the freezing-liquid. This agitation of the liquid is rendered necessary by its poor conductivity, except by convection or actual contact. Another requisite is that the freezing liquid or compound be cut off or insulated as much as possible from the surrounding atmosphere, in order that it cannot absorb any heat from that source. I accomplish these results by using a reciprocating agitator, which is inclosed entirely within the outer casing, and has an inclined slotted blade, which alternately forces the liquid against the vessel containing the article to be frozen and then drawing it away from it. The blade is slotted to break up any continuous currents that might be formed, and thus causes the liquid to be the more thoroughly commingled and carried to and from the said vessel. To prevent the shaft for moving the agitator from conveying heat from the exterior to the interior, I make the walls of the outer casing double, with a dead-air space between them, and pass the shaft through these walls and the air-space. This air-space may be further utilized by dividing it into compartments for cooling fruits, food, and other solid substances.

A in the several figures represents the case containing the various receptacles, which may be made of any suitable material and is provided with an opening at its top. I prefer to provide the top of the casing with an inwardly-projecting rim or ledge $a$, extending into the hole or opening.

A' is a cover for the case.

B B, Fig. 1, are doors for closing the cooling-chambers B', Fig. 2, which are provided with shelves for holding articles.

C, Fig. 2, is a receptacle for the water to be frozen, and is provided with tapering walls, which permit the ice to be readily removed in a solid cake. The vessel is of such a size that when placed in the casing it is supported upon the ledge $a$ and closes the opening in the top. The cover A' is then put over the top of the vessel and upon the top of the casing and makes substantially an air-tight closure into the casing at the only point where the air could enter it.

D' is a shaft journaled in the sides of the casing, having a handle D secured to its outer end, and provided with a crank $D^2$ at its inner end.

$D^3$ is a lever or agitator pivoted at $D^4$, and having the blade $D^5$, Figs. 2, 4, and 5, with holes $D^6$. By suspending the lever from its upper end and below the ledge $a$ it is entirely within the casing, and is also out of the way of the insertion and removal of the vessel C. It also permits of the vessel being made continuous, so that its contents may be frozen in a solid mass, whereby it will keep longer and is more easily removed from it when wanted, and by placing the vessel in the midst of the freezing-liquid its heat is taken up more quickly than where this position is reversed, as the heat is absorbed from it in all directions.

$D^7$, Figs. 2 and 4, is a slot in which the end $D^2$ of the crank works, causing the agitator $D^3$ to be vibrated back and forth through the freezing compound when the crank D is turned.

By journaling the shaft D' in the sides of the casing, as above described, it is supported at two points by providing each wall or side with any ordinary bearings. It also permits of the agitator being placed entirely within the casing, and by operating it by means of a shaft that passes through two walls and through a chamber between them there is the least possibility of the warm air being admitted to the interior of the casing to counteract the effects of the freezing-mixture, and by pivoting the agitator-lever near the top of the inner wall it is not so apt to be affected by the brine or other liquid generally used in cooling. It also secures it to one side of the receptacle for the cooling compound, so that it is out of the way of the receptacle C in which the article is placed that is to be frozen. This permits of the ready removal or insertion of the receptacle C without having to remove or adjust the agitator in any manner.

The blade $D^5$ projects laterally under the bottom of the receptacle C from the lower end of the lever $D^3$ and is set on an angle, in order that the compound may be lifted against the walls of the water-receptacles C with great force when the blade is moved in one direction, while the holes $D^6$ break any steady current which may be caused by rapidly working the machine.

By placing the lever at one side of the casing or between the inner wall and the receptacle C it takes up the least possible room where room is needed for as large a receptacle as possible, and yet it enables a very large and peculiarly arranged and constructed blade to be operated beneath the recepacle for agitating the cooling liquid and causing it to be rapidly circulated around the receptacle.

The space C', Fig. 2, surrounds the receptacle C except at its top, and contains the freezing compound. The thin walls separating the space C' and the cooling-chambers B' permit the freezing compound to readily cool articles of food and drink.

Instead of the doors B, sliding drawers may be used in which to put the articles to be cooled, as at $B^2$, Fig. 2.

After each operation of the machine the freezing compound used must be evaporated to restore the salts. This necessitates the removing of the compound from the chamber C'. To avoid this inconvenience as far as possible, the case A is provided with a lower receiving-receptacle $A^2$, into which the compound may be discharged by means of the outlet $E^3$ and the stop-cock E, and stored until a sufficient quantity is accumulated to be evaporated, when it is removed through the opening E' by the stop-cock $E^2$ into a retort. The storing of this compound also has a cooling effect on the chambers B'.

Instead of the slot $D^7$ in the agitator $D^3$, a link $D^8$, Fig. 6, may be employed to connect with the crank $D^2$ at $D^9$.

Having thus fully described my invention, what I claim as new, and desire to secure by Letters Patent, is—

1. In an ice-freezing machine, the combination, with a casing having an opening in its top, of a vessel supported therein at a distance from the casing forming a space for the reception of a freezing-liquid, a lever suspended at its upper end near the top and within the casing and extending downwardly below the bottom of the vessel, a blade extending laterally therefrom between the bottom of the vessel and the casing, and means for operating the lever and blade, substantially as described.

2. In an ice-freezing machine, the combination, with a casing having an opening and an inwardly-projecting ledge or rim at its top, of a vessel suspended within the casing by means of the ledge forming a space for the reception of a freezing-liquid, a cover over the top of the vessel and upon the casing, a lever suspended upon the inner side of the casing below the ledge and extending downward between the vessel and the casing and having an inclined slotted blade projecting laterally from its lower end between the bottom of the vessel, and means for reciprocating the lever and blade, substantially as described.

3. In an ice-freezing machine, the combination, with a double-walled casing forming a dead-air space or chamber at its side and having an opening at its top, of a vessel suspended within and closing the opening and forming a space for the reception of a freezing-liquid, a cover, a slotted lever pivotally secured at its upper end to the inner side of the casing near the top, a blade at its lower end projecting laterally between the bottom of the vessel and the casing, and a shaft journaled in the walls of the casing, the inner end of which is provided with a crank which works within the slot and operates the lever, and its outer end is provided with a crank for operating the shaft, substantially as described.

In testimony that I claim the foregoing as my invention I have signed my name, in pres- of two witnesses, this 25th day of April, 1890.

CHAS. C. SMITH.

Witnesses:
E. T. THOMAS,
JOHN JENKINS, Jr.